US006079985A

United States Patent [19]

Wohl et al.

[11] Patent Number: 6,079,985

[45] Date of Patent: Jun. 27, 2000

[54] PROGRAMMABLE SOUND AND MUSIC MAKING DEVICE

[75] Inventors: David J. Wohl, Kingston, R.I.; Joseph F. Truchsess, Ridgefield, Conn.; Alexander L. Baytman, N. Providence; Robert S. Winslow, Newport, both of R.I.

[73] Assignees: Hasbro, Inc., Pawtucket, R.I.; Pragmatic Designs, Inc., Port Chester, N.Y.

[21] Appl. No.: 08/956,486

[22] Filed: Oct. 23, 1997

[51] Int. Cl.[7] ...................... B01J 23/00

[52] U.S. Cl. ...................... 434/319; 434/308; 446/397; 446/408

[58] Field of Search ...................... 446/175, 408, 446/397; 434/308, 319; 84/423 R, 615, 602, 1, 600

[56] References Cited

U.S. PATENT DOCUMENTS

| | | | |
|---|---|---|---|
| D. 316,858 | 5/1991 | Gobindram | D14/143 |
| D. 337,771 | 7/1993 | Leung | D21/113 |
| 3,598,889 | 8/1971 | Switsen | 84/1.01 |
| 3,871,112 | 3/1975 | Licitis | 35/8 |
| 4,226,155 | 10/1980 | Ferdinand | 84/1.03 |
| 4,336,935 | 6/1982 | Goldfarb | 273/1 |
| 4,480,521 | 11/1984 | Schmoyer | 84/1.28 |
| 4,729,564 | 3/1988 | Kuna et al. | 273/1 |
| 4,790,790 | 12/1988 | Todokoro | 446/408 |
| 4,974,486 | 12/1990 | Wallace | 84/609 |
| 4,986,792 | 1/1991 | Chen | 446/408 |
| 5,009,145 | 4/1991 | Ishida et al. | 84/612 |
| 5,049,107 | 9/1991 | De Nittis | 446/397 |
| 5,095,799 | 3/1992 | Wallace et al. | 84/609 |
| 5,145,447 | 9/1992 | Goldfarb | 446/448 |
| 5,184,971 | 2/1993 | Williams | 446/142 |
| 5,209,665 | 5/1993 | Billings et al. | 434/169 |
| 5,314,336 | 5/1994 | Diamond et al. | 434/169 |
| 5,368,308 | 11/1994 | Darnell | 273/429 |
| 5,382,188 | 1/1995 | Tomellini | 446/397 |
| 5,413,355 | 5/1995 | Gonzalez | 273/429 |
| 5,433,610 | 7/1995 | Godfrey et al. | 434/169 |
| 5,461,188 | 10/1995 | Drago et al. | 84/600 |
| 5,501,601 | 3/1996 | Todokoro et al. | 434/169 |
| 5,520,544 | 5/1996 | Manico et al. | 434/317 |
| 5,545,071 | 8/1996 | Shiraishi | 446/143 |
| 5,595,489 | 1/1997 | Kwon | 434/319 |
| 5,651,681 | 7/1997 | Chan | 434/308 |
| 5,668,333 | 9/1997 | Horton et al. | 84/470 R |
| 5,679,049 | 10/1997 | Arad et al. | 446/142 |
| 5,736,662 | 4/1998 | Spector | 84/600 |
| 5,841,051 | 11/1998 | Segan | 84/477 R |
| 5,851,119 | 12/1998 | Sharpe, III et al. | 434/317 |
| 5,907,115 | 5/1999 | Matsunaga et al. | 84/477 R |

*Primary Examiner*—Valencia Martin-Wallace
*Assistant Examiner*—David A. Fleming
*Attorney, Agent, or Firm*—Marshall, O'Toole, Gerstein, Murray & Borun

[57] ABSTRACT

An electronic sound and music making device includes a memory that stores a plurality of sound segments, such as musical notes, animal noises, etc., a keypad having a series of keys, each of each indicates and is associated with a different one of the stored sound segments, and a set of visual indications, such as light emitting diodes (LEDs), that indicate when different ones of the sound segments are being played. The device repeats a programmable sequence of, for example, four of the stored sound segments to form a song while, simultaneously turning on different ones of the LEDs to indicate the different sound segments being played. The keypad enables a user to specify the identity and the order of the sound segments to be played and allows a user to substitute any of the sound segments stored in the memory with the sound segments being played so as to produce a new or different song.

24 Claims, 4 Drawing Sheets

PROGRAMMABLE SOUND AND MUSIC MAKING DEVICE

BACKGROUND OF THE INVENTION

The present invention relates generally to toys and, more particularly, to programmable sound and music making toys.

DESCRIPTION OF RELATED ART

Numerous children's toys include integrated circuits commonly referred to as sound cards, speech chips, etc.) or other recording devices that store a plurality of sounds, such as animal noises, musical notes, etc., for playback at appropriate times during operation of the toys. Some toys play one or more prerecorded sounds or noises when prompted to do so by a user. For example, Billings et al., U.S. Pat. No. 5,209,665, discloses an interactive audio-visual learning device having text, pictures and/or other printed material in the form of a book along with a keyboard having a plurality of keys, each of which is associated with a particular sound or noise. The keys may be pressed at different times during a reading of the book to cause the device to produce the sound associated with the key which, in turn, enhances the telling of the story or tale within the book. Godfrey et al., U.S. Pat. No. 5,433,610, discloses an educational device having a series of pictures of, for example, animals or other common objects, and a recording device that stores sounds or noises associated with each of the pictures. When one of the pictures is pressed, the device plays the sound or noise associated with that picture to help the user associate the retrieved sound or noise with the selected picture. Similarly, De Nittis, U.S. Pat. No. 5,049,107, discloses a ball having a series of images thereon depicting, for example, different national flags and a recording device that plays the national anthems of the countries associated with the flags when one or more of the flags is pressed or otherwise selected.

Other known toys play selected sounds at one or more appropriate times to enhance a song or as part of a game. For example, Goldfarb, U.S. Pat. No. 5,145,447, discloses a children's toy that allows a user to specify one of a plurality of sounds or noises for playback during a song. The Goldfarb toy includes a set of keys, each associated with a picture representing a different animal, and a sound card that stores and plays animal noises associated with each of the depicted animals. During operation, the Goldfarb toy plays a verse of a well known children's song like "Old Mcdonald Had a Farm" and, at the appropriate time, allows the user to press one of the keys to select the animal noise to be reproduced in the verse. During each new verse of the song, the Goldfarb toy repeats or plays previously selected animal noises according to the order in which these noises were selected.

Darnell, U.S. Pat. No. 5,368,308 discloses a sound recording and playback device that records a song, cuts the song into a plurality of individual segments and then scrambles the order of those segments to produce a scrambled version of the song. Thereafter, the device plays the randomized sound segments. A user then selects keys associated with the LEDs to rearrange the randomized segments of the song in an attempt to put the randomized segments back into their original order so as to produce the original song. The device includes a light emitting diode (LED) associated with each of the segments which is turned on when the segment associated therewith is placed in the proper position or order.

While each of the above-identified devices includes keys that allow a user to specify prerecorded sounds or sound segments, none of these devices is particularly useful in enabling a user (such as a child) to put different basic sounds or noises together in different sequences to form new tunes or songs. Furthermore, none of these devices includes a mechanism that allows a user to change certain portions of a song while the song is playing to thereby modify a song or to create a new song.

SUMMARY OF THE INVENTION

The present invention is directed to a programmable electronic sound and music making device that repeats a sequence of, for example, four sound segments to form a song. The device includes a memory that stores a plurality of sound segments, which may be any desired sounds or noises including, for example, animal noises, musical notes, speech, body noises, wacky sounds, etc., and also includes a buffer having registers that store indications of, for example, four of the stored sound segments. The device further includes a set of visual indications, such as LEDs, that indicate the different sound segments of the song being played and a keypad having keys associated with the different sound segments and including a pictorial representation of the associated sound segment thereon. The keypad enables a user to specify the identity and the order of the sound segments to be played and allows a user to change any of the sound segment indications stored in the buffer so as to produce a new or different song.

During operation, the sound and music making device scrolls through the registers of the buffer memory and plays the sound segments indicated therein while, simultaneously, operating the visual indication associated with each of the registers. The sound and music making device accepts input from the keypad to change the indication of the sound segment stored at each register to thereby change the song being played. Furthermore, a user controlled potentiometer changes the tempo or rate at which the sound segments are played. Because the electronic sound and music making device of the present invention can be reprogrammed to change the identity, order and/or speed of the sound segments forming a song, it is capable of playing a great number of different songs and, thereby, is capable of keeping a user interested and entertained for a long period of time.

DESCRIPTION OF THE PREFERRED EMBODIMENTS

Figure 1:
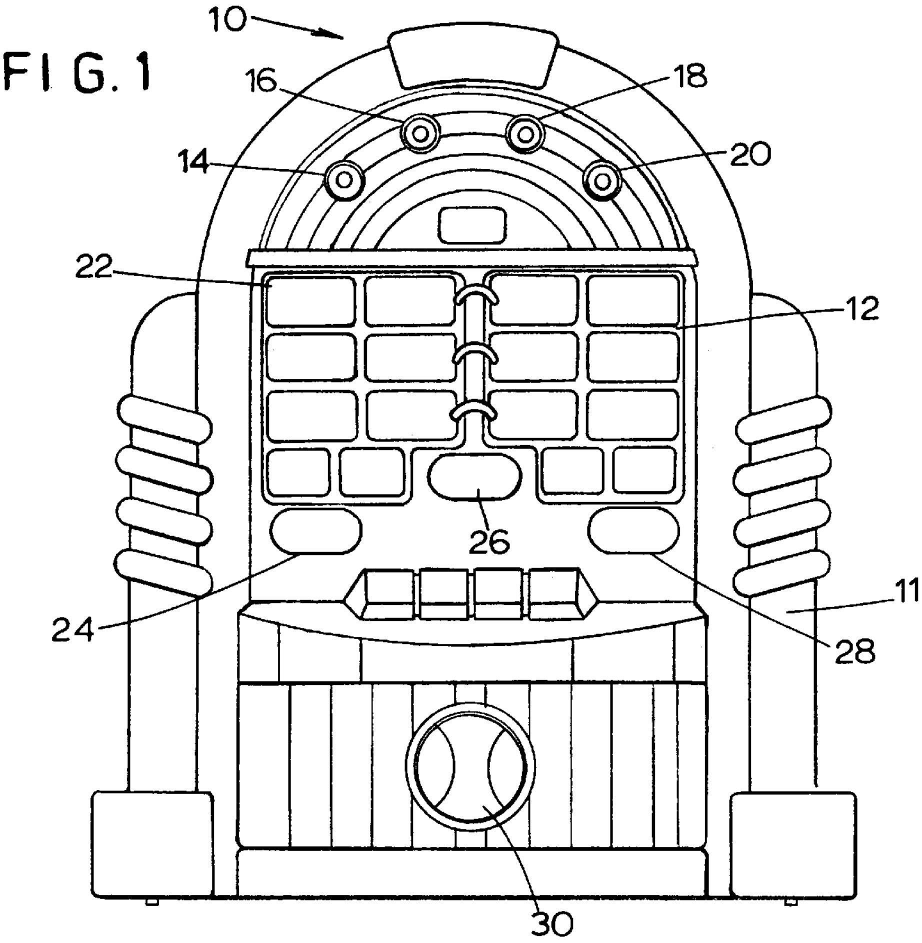
FIG. 1 is a front view of a programmable sound and music making device according to the present invention.

Referring to FIG. 1, a sound and music making device 10 according to the present invention includes a casing 11 preferably in the shape of a miniature jukebox. A keypad 12 is disposed on a surface of the casing 11 and a set of visual indications, such as LEDs 14, 16, 18 and 20, are arranged on the casing 11 above the keypad 12. During operation, the device 10 turns each of the LEDs 14, 16, 18 and 20 on and off in sequence and plays a sound segment associated with each of the LEDs 14–20 when each of the LEDs 14–20 is turned on. After the LED 20 is turned off, the device 10 starts over by turning the LED 14 on and playing the sound segment associated therewith to thereby play a continuous repetitive song made up of the sound segments associated with the LEDs 14–20.

Figure 2:
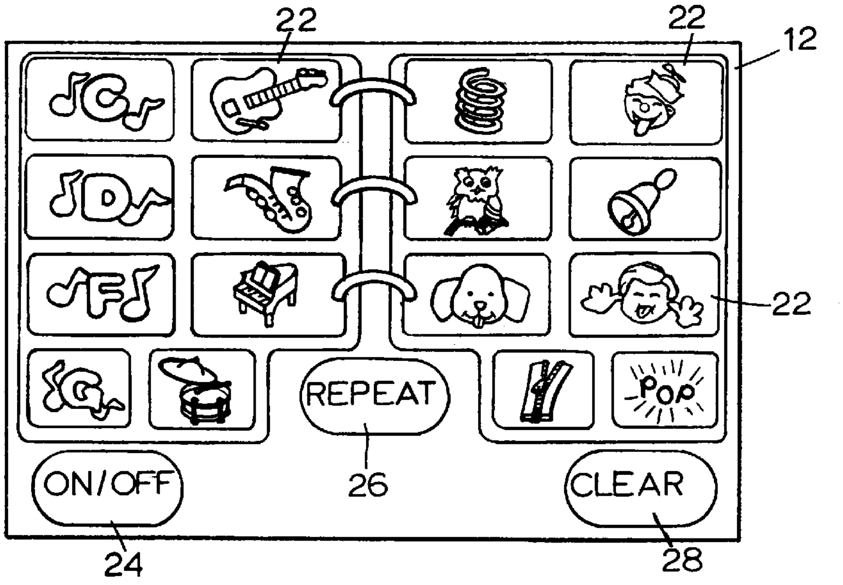
FIG. 2 is an enlarged front view of a keypad of the programmable sound and music making device of FIG. 1.

The keypad 12, illustrated in more detail in FIG. 2, includes a plurality of keys 22 which allow a user to reprogram or specify the sound segments associated with the LEDs 14–20. Preferably, each of the keys 22 is associated with and depicts a particular sound segment stored in a memory (not shown in FIGS. 1 and 2). The sound segments associated with the keys 22 may comprise, for example, any desired speech segments, musical notes, noises or other commonplace, fanciful or wacky sounds. In the embodiment illustrated in FIGS. 1 and 2, the device 10 includes sixteen keys 22 that depict and are associated with the sounds of (from left to right and top to bottom) a C chord, a guitar, a spring, a clown (laughter), a D chord, a horn, an owl (hooting), a bell, an F chord, a piano, a dog (barking), a child (spitting), a G chord, a drum, a zipper and an explosion or a pop. Selection of any one of the keys 22 while one of the LEDs 14, 16, 18 or 20 is turned on changes the sound segment associated with that LED to the sound segment specified by the selected key 22.

The keypad 12 also includes control keys, comprising an ON/OFF key 24, a REPEAT key 26 and a CLEAR key 28, that may be used to control operation of the device 10. The ON/OFF key 24 turns the device 10 on and off while the REPEAT key 26 causes the sound segment currently being played to repeat for as long as the REPEAT key 26 is pressed. The CLEAR key 28 resets the sounds segments associated with the LEDs 14–20 to a default setting and causes the device 10 to restart playing the sequence of sound segments associated with the LEDs 14–20.

As illustrated in FIG. 1, the device 10 also includes a potentiometer 30 that controls the tempo or the rate at which the sounds segments associated with the LEDs 14–20 are played.

During operation of the device 10, the ON/OFF key 24 or the CLEAR key 28 is pressed to turn the device 10 on. Thereafter, the device 10 turns the LED 14 on and plays the sound segment currently associated with the LED 14. The device 10 then turns the LED 14 off, turns the LED 16 on and plays the sound segment associated therewith. The device 10 repeats this procedure for the LEDs 18 and 20. After turning the LED 20 off, the device 10 starts over at the LED 14 to repeat the sequence of sound segments associated with the LEDs 14–20 to thereby form a continuous song made up of the sound segments associated with the LEDs 14–20. The device 10 repeats the playing of the sound segments associated with the LEDs 14–20 until the ON/OFF key 24 is pressed or until none of the keys 22, 24, 26 or 28 is pressed for a predetermined amount of time.

As noted above, while the device 10 is playing the sound segments associated with the LEDs 14–20, the device 10 monitors the keypad 12 to determine if any one of the keys 22, 24, 26 and 28 is pressed. When one of the keys 22 is pressed, the device 10 causes the sound segment specified by the selected key 22 to be associated with the LED 14–20 that is currently in the on state to thereby reprogram the sound segment associated with the LED 14–20 to that of the selected key 22. As a result, any of the sound segments being played by the device 10 can be reprogrammed while the device is operating without interrupting the rhythm or the "beat" created by the sequential repetition of four successive sound segments. In fact, when a user presses one of the keys 22, the new sound segment specified by that key 22 is associated with the LED that is currently in the on state without interrupting the sound segment currently being played and without changing the timing or beat at which the sound segments are played. Instead, the sound segment currently being played is completed, and the new sound segment is then played at a time that maintains the rhythm associated with the device 10, replacing the previous sound segment associated with the LED currently in the on state.

When the REPEAT key 26 is pressed, the device 10 repeats the sound segment currently being played, i.e., the sound segment associated with the LED 14–20 that is currently in the on state, while keeping that LED turned on. When the CLEAR key 28 is pressed, the device 10 resets the sound segments associated with the LEDs 14–20 to a default setting and the device 10 starts over by turning the LED 14 on, playing the sound segment associated with the LED 14 and so on. As will be understood, a user can use the keys 22, 26 and 28 and the potentiometer 30 to reprogram the device 10 to play and repeat different combinations of sound segments in any desired order and at any desired speed or tempo.

Figure 3:
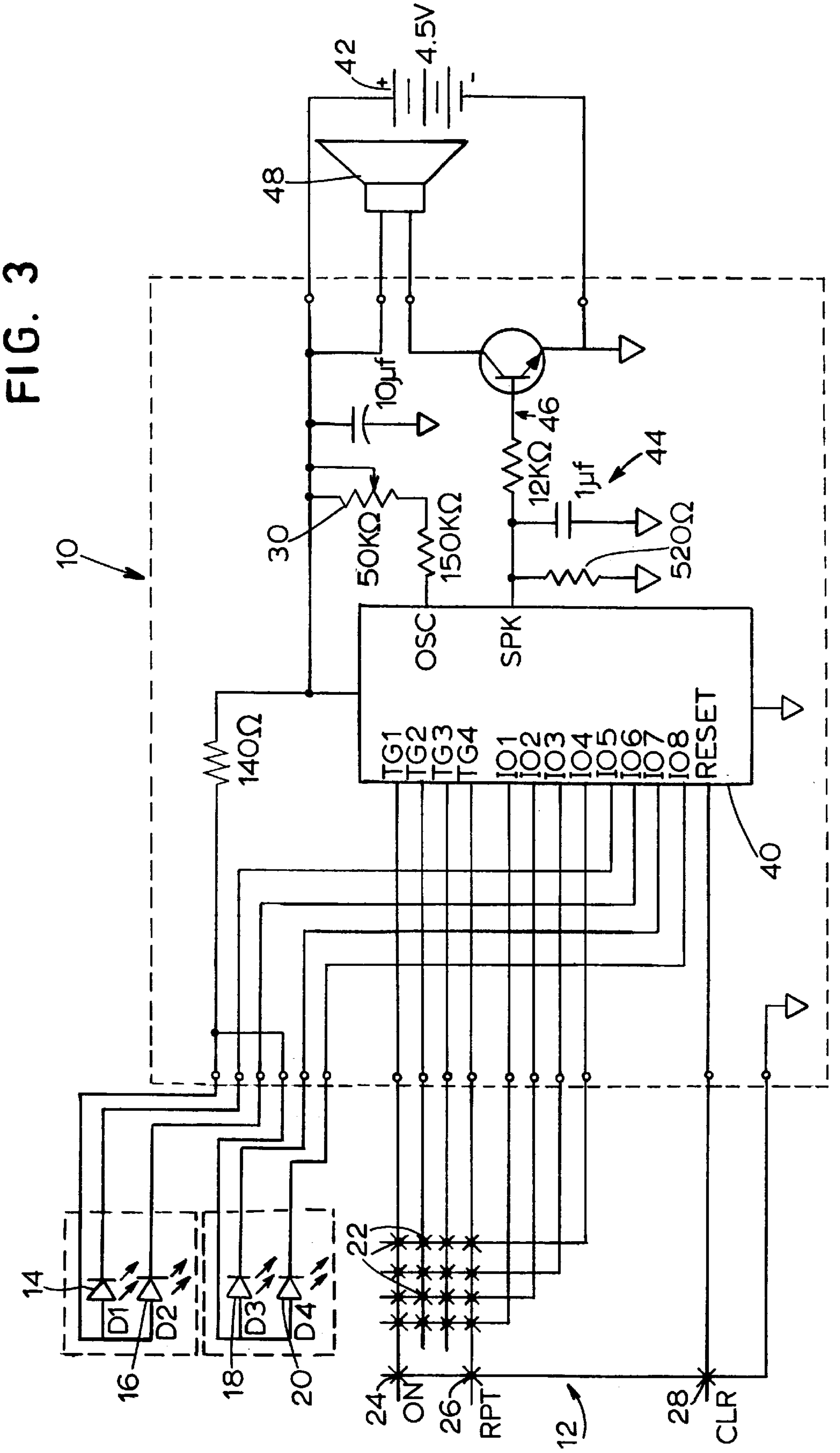
FIG. 3 is a circuit schematic of the programmable sound and music making device of FIG. 1.

Referring now to FIGS. 3 and 4, the electronic components of the device 10 are illustrated in more detail. As illustrated in FIG. 3, a speech chip 40, which may be, for example, a Windbond sound card or sound chip manufactured by the Windbond Corporation based in San Jose, Calif. (I.D. Part No. W529XX, e.g., W52905) or any other desired sound or speech chip, stores the sound segments associated with each of the keys 22 as well as other sound segments such as default sound segments for each of the LEDs 14–20 (which may be, for example, metronome beats), a beginning message such as a "Let's go" message and/or an ending message such as a "See ya" message. The speech chip 40 also includes a microprocessor (such as a 4-bit microprocessor) that controls the operation of the device 10. In a preferred embodiment, the speech chip 40 includes a buffer memory with, for example, seven registers or memory locations, four of which store indications of the sound segments currently associated with the LEDs 14–20. However, as will be understood, the speech chip 40 can be replaced with any other digital or analog processor having sound storage capabilities and structure (including any hard-wired or software controlled structure) that controls the playback of the stored sounds segments.

The keypad 12, which is connected to the TG1–TG4 (trigger), the IO1–IO4 (input/output) and the RESET terminals of the Windbond speech chip 40, preferably comprises two mylar sheets disposed directly adjacent one another. One of the mylar sheets includes a series of conductive pads (one for each key 22, 24, 26 and 28) disposed at regularly spaced locations thereon while the other of the mylar sheets includes a series of shorting bars, one of which is disposed adjacent to (above) a corresponding one of the pads of the first mylar sheet at each key location (indicated by an "X" in FIG. 3). The conductive pads and shorting bars of the mylar sheets are held apart from one another (in a non-conducting state) by small, non-conductive indentations within the mylar sheets so that the pads and shorting bars of the mylar sheets do not contact one another unless and until pressure is applied to the key at the location of the pads. Each of the pads of the mylar sheet is electrically connected to one of the TG1–TG4 terminals or to the RESET terminal of the speech chip 40 or to one of the IO1–IO4 terminals of the speech chip 40 or to an electrical ground. When one of the keys 22, 24, 26 or 28 is pressed, a conductive pad and a shorting bar of the mylar sheets forming the key contact each other to create an electrical path between one of the TG1–TG4 or RESET terminals of the speech chip 40 and one of the IO1–IO4 terminals of the speech chip 40 or electrical ground. The particular connection made (which is different for each of the keys 22, 24, 26 and 28) is detected by the speech chip 40 which may, for example, sequentially connect each of the terminals IO1–IO4 to an electrical ground and determine if a ground signal is present or received at any of the TG1–TG4 or the RESET terminals of the speech chip 40. When such a connection is detected, the speech chip 40 recognizes that a particular one of the keys 22, 24, 26 or 28 has been pressed. of course, if desired, the keypad 12 could be constructed of other materials or could be configured in any other desired manner. For example, the keypad 12 could comprise any standard keyboard or keypad such as a numerical and/or alphabetical keypad.

As illustrated in FIG. 3, the LEDs 14, 16, 18 and 20 are connected between a battery 42 and terminals IO5–IO8, respectively, of the speech chip 40. Likewise, the SPK (speaker) output of the speech chip 40 is connected through a filter 44 and an a current scaler 46 (including the base resistor and the transistor illustrated in FIG. 3) to a speaker 48 while the OSC (oscillator) terminal of the speech chip 40 is connected to the battery 42 through the potentiometer 30. As will be understood, the setting of the potentiometer 30 controls the voltage at the OSC terminal which, in turn, controls the speed at which a sound segment stored in the memory of the speech chip 40 is delivered to the speaker 48. Furthermore, the current scaler 46 is designed to enable the use of a 32 ohm speaker 48 with the Windbond chip which is designed for an 8 ohm speaker. As a result, the current scaler 46 will not be necessary in all embodiments.

During operation, the speech chip 40 connects one of the LEDs 14–20 (i.e., one of the inputs IO5–IO8) to ground to thereby turn the one of the LEDs 14–20 on. Thereafter, the speech chip 40 recovers a sound segment associated with the one of the LEDs 14–20 and delivers that sound segment to the SPK output at a rate controlled by the setting of the potentiometer 30. Thereafter, the speech chip 40 disconnects the one of the LEDs 14–20 from ground to turn that LED off and repeats this procedure for the next LED 14–20. Simultaneously, the speech chip 40 detects if any of the keys 22, 24, 26 or 28 is pressed and takes an appropriate action if one of those keys is pressed.

Generally speaking, the speech chip 40 uses a buffer memory having eight registers R0–R7. The register R0 stores an indication of or points to one of the registers R1, R2, R3 or R4 to keep track of which LED 14, 16, 18 or 20 is currently turned on and, therefore, which sound segment is currently being played. The registers R1–R4 store indications of the sound segments associated with the LEDs 14–20, respectively, at any particular time. The indications stored in the registers R1–R4 may be, for example, the memory locations of the sound segments currently associated with the LEDs 14–20, the playback areas of the chip in which the designated sound segments are located, the actual digital or analog representation of the sound segments, or any other desired indication of the sound segments programmed to be played when the LEDs 14–20 are turned on. The register R5 stores a pointer for the LEDs 14–20 to indicate the address or input/output formula necessary for connecting a particular one of the LEDs 14–20 to ground to thereby turn that LED on. The register R6 stores a clock setting which may be set to any value but, preferably, is set to approximately 30 seconds. The register R6 is tied to an internal clock and counts down during operation of the device 10. In the preferred embodiment, the register R7 remains unused.

Figure 4A:
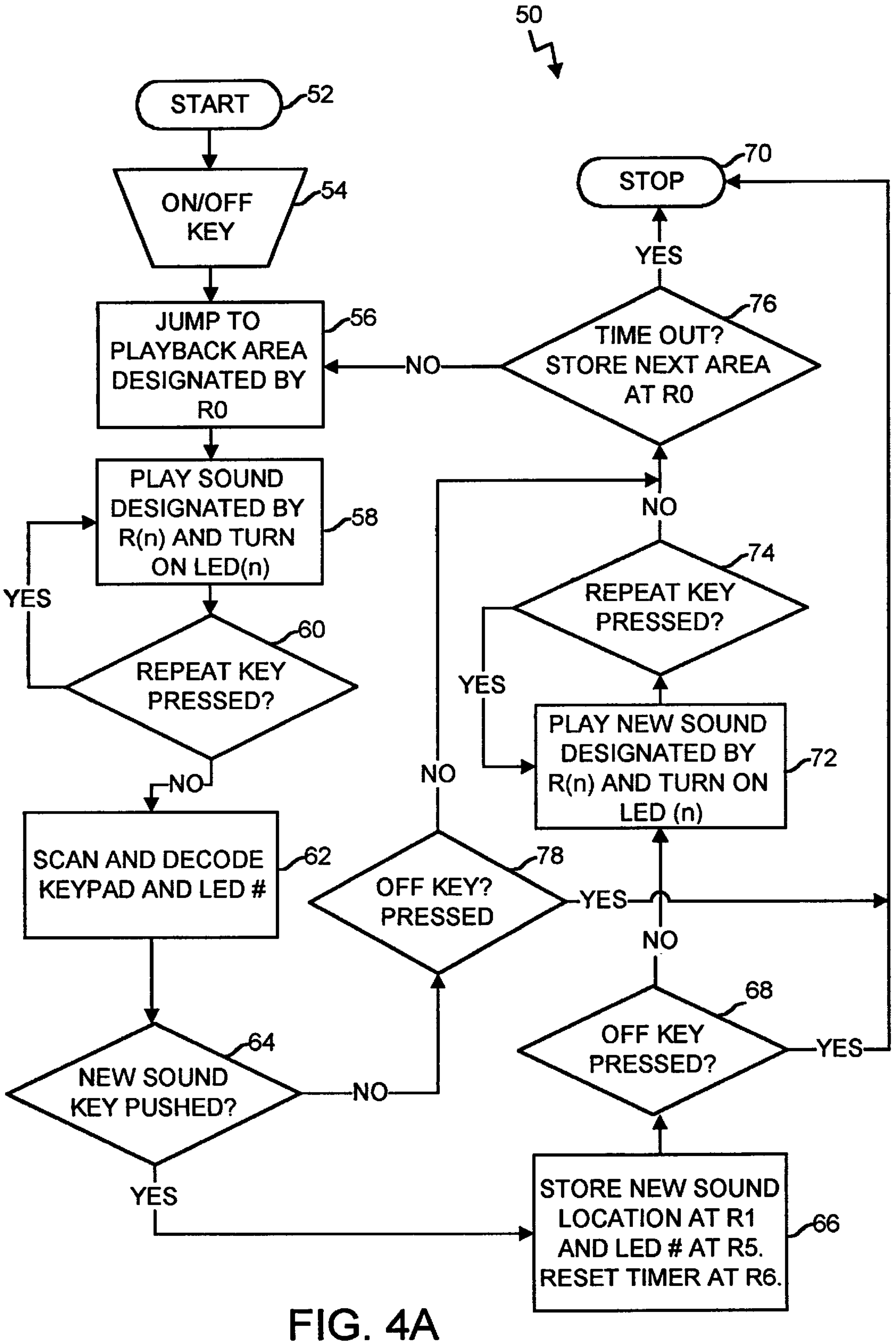
FIGS. 4A and 4B illustrate a flowchart of a software routine implemented by a speech chip of the programmable sound and music making device of FIG. 1.
Figure 4B:
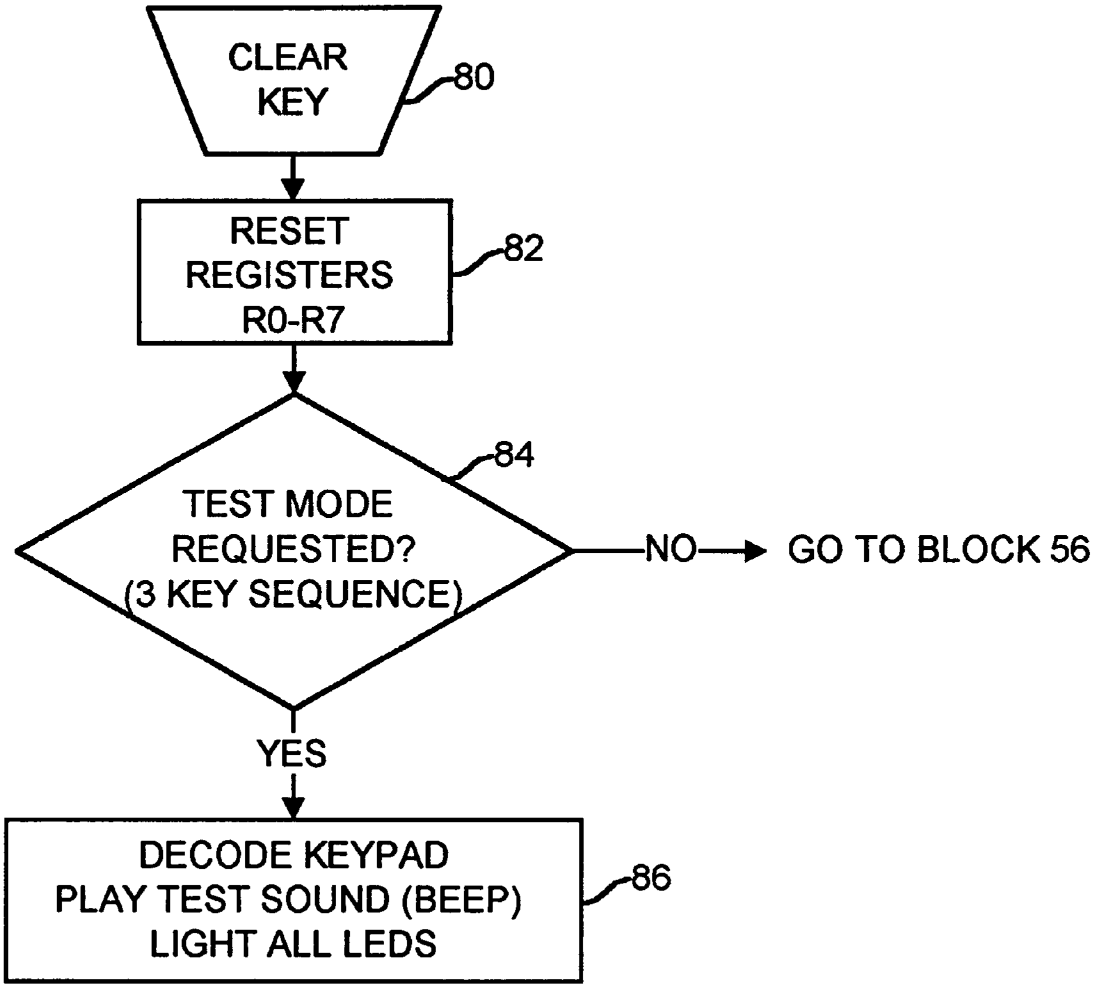

Referring now to FIGS. 4A and 4B, a flowchart 50 illustrates operation of the processor of the speech chip 40. As illustrated in FIG. 4A, a start block 52 recognizes whether the ON/OFF key 24 or the CLEAR key 28 is pressed. If the ON/OFF key 24 is pressed, a block 54 plays a beginning message stored in memory such as "Lets jam" and then a block 56 jumps to a playback area indicated by the register R0 (which points to a playback area designated by one of the registers R1, R2, R3 or R4). In particular, the block 56 retrieves or obtains from memory the sound segment associated with the sound segment indication stored in the register R(n) where n equals 1, 2, 3 or 4 and is specified by the register R0. A block 58 plays the sound segment indicated by the register R(n) and turns on the LED(n), i.e., the LED 14, 16, 18 or 20 associated with register R(n). Thereafter, a block 60 determines whether the REPEAT key 26 is pressed and, if so, returns control to the block 58 which again plays the sound segment indicated by the register R(n) and turns LED(n) on.

When the REPEAT key 26 is not pressed at the block 60, a block 62 scans and decodes the keypad 12 and a block 64 recognizes whether one of the keys 22 is pressed. If so, a block 66 stores an indication (for example, the memory location) of the new sound segment associated with the pressed key 22 in the register R(n) so as to associate that new sound segment with the LED(n). The block 66 also stores the LED number or address at in the register R5 and resets the timer in the register R6 to the maximum time (e.g., 30 seconds).

Next, a block 68 determines if the ON/OFF key 24 is pressed and, if so, a stop block 70 turns the device 10 off. If desired, the stop block 70 may play an exit or ending message such as "See ya" before it turns the device 10 off. If, however, the ON/OFF key 24 is not pressed at the block 68, a block 72 plays the new sound segment designated by the indication stored in the register R(n) and turns the LED(n) (as specified by the register R5) on. A block 74 then determines if the REPEAT key 26 is pressed and, if so, returns control to the block 72. If the REPEAT key 26 is not pressed, however, control is provided to a block 76.

If, at the block 64, a key 22 has not been pressed, a block 78 determines if the ON/OFF key 24 is pressed and, if so, delivers control to the block 70 which turns the device 10 off. Otherwise control is provided to the block 76.

The block 76 determines if the clock at the register R6 has timed out (i.e., has reached zero) indicating that no key 22 has been pressed for a particular amount of time (for example, 30 seconds). If the clock has timed out, control is provided to the block 70 which turns the device 10 off to prevent the battery from draining because, presumably, the device 10 has been abandoned or left unattended. However, if the clock has not timed out, the block 76 stores the next playback area associated with the next register R1, R2, R3 or R4 in the register R0 and may store the address or indication of the next LED in the register R5. In effect, the block 76 increments the n variable so as to cause the device 10 to scroll through and play the sound segments indicated by the registers R1–R4. If, at the block 76, the register R0 indicates the playback area associated with the register R4 (i.e., the register associated with LED 20), then the block 76 sets the register R0 to point to the register R1, i.e., the register associated with the LED 14.

Thereafter, the block 76 provides control to the block 56 which jumps to the playback area associated with the next register R(n). The loop made up of the blocks 56–76 repeats until the clock in the register R6 times out, the ON/OFF key 24 is pressed or the CLEAR key 28 is pressed.

As is evident from the circuit schematic of FIG. 3, whenever the CLEAR key 28 is pressed, the RESET terminal of the speech chip 40 is connected to electrical ground which causes the speech chip 40 to undergo a hard reset. This hard reset is indicated by the block 80 of FIG. 4B. After a hard reset, a block 82 resets the registers R0–R7 to default settings. Preferably, the register R0 is set to indicate the playback area associated with the register R1 and the registers R1–R4 are set to indicate a default sound segment comprising, for example, a metronome beat. The register R5 is preferably set to indicate the LED 14 address and the register R6 (the clock) is set to a maximum time of, for example, 30 seconds.

A block 84 then tests to see if the device 10 is to enter a test mode by determining if a sequence of, for example, three particular keys 22 is entered. If the proper sequence of keys 22 is not entered at the block 84, control is provided to the block 54 (FIG. 4A) which plays a beginning message and gives control to the block 56 as described above. However, if the proper sequence of keys 22 is entered at the block 84, a block 86 implements a test procedure which, preferably, plays a test sound to test the operation of the speech chip 40 and turns the LEDs 14, 16, 18 and 20 on, either together or in sequence, to test the operation of the LEDs 14–20. The test sequence of the block 86 may also perform any other desired tests including, for example, testing of each of the keys 22, 24, 26 and/or 28, etc. At the end of the test sequence of the block 86, the device 10 may turn off or may jump to the block 54 (FIG. 4A) to begin the play mode.

While the present invention has been described as including visual indications comprising LEDs 14–20 associated with the playing of one or more sound segments, any other desired visual indications including, for example, other types of lights, moving members, etc., can be used instead of or in addition to the LEDs 14–20. Furthermore, while the present invention has been described as including four LEDs 14–20 and as playing a series of four sound segments in a repetitive manner, it should be noted that any other number of LEDs (or other visual indications) and sound segments can be used instead.

Furthermore, while the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

What is claimed is:

1. A programmable sound making device, comprising:

a memory that stores a plurality of sound segments;

a speaker;

a buffer that stores an ordered set of sound segment indications, each of which indicates one of the plurality of sound segments;

a processor that retrieves the sound segments specified by the ordered set of sound segment indications stored in the buffer in a repetitive manner;

means for delivering the retrieved sound segments to the speaker to thereby cause the sound segments associated with the ordered set of sound segment indications to be played in a repetitive manner to form a song or a tune; and means for programming the buffer to replace one of the ordered set of sound segment indications with an indication of one of the sound segments stored in the memory.

2. The programmable sound making device of claim 1, wherein the programming means includes a keypad having a multiplicity of keys.

3. The programmable sound making device of claim 2, wherein each of the multiplicity of keys is associated with a different one of the sound segments stored in the memory.

4. The programmable sound making device of claim 3, wherein each of the multiplicity of keys includes a pictorial representation of the sound segment associated therewith.

5. The programmable sound making device of claim 1, wherein the processor consecutively retrieves the sound segments specified by the ordered set of sound segment indications and wherein the delivering means delivers the retrieved sound segments to the speaker in a consecutive manner.

6. The programmable sound making device of claim 1, wherein the buffer stores an ordered set of four sound segment indications.

7. The programmable sound making device of claim 1, further including a visual indication associated with each of the sound segment indications stored in the buffer and means for operating the visual indication associated with one of the sound segment indications when the retrieved sound segment specified by the one of the sound segment indications is delivered to the speaker.

8. The programmable sound making device of claim 7, wherein the visual indications comprise lights.

9. The programmable sound making device of claim 7, wherein the visual indications comprise light emitting diodes.

10. The programmable sound making device of claim 7, further including means for initiating a test routine that automatically tests the visual indications.

11. The programmable sound making device of claim 1, wherein the programming means includes a keypad having a key that causes the processor to retrieve the sound segment indicated by one of the sound segment indications in a repetitive manner.

12. The programmable sound making device of claim 1, further including means for playing a predetermined sound segment when the device is turned on.

13. The programmable sound making device of claim 1, further including means for playing a predetermined sound segment immediately before the device turns off.

14. The programmable sound making device of claim 1, wherein the programming means includes a keypad having a key that resets the sound segment indications to default sound segment indications.

15. The programmable sound making device of claim 1, further including means for initiating a test routine that automatically tests the processor.

16. The programmable sound making device of claim 1, further including a potentiometer coupled to the delivering means that controls the rate at which the retrieved sound segments are delivered to the speaker.

17. A sound making device comprising:

a memory that stores a first number of sound segments;

a speaker;

a buffer having a second number of buffer locations, wherein each buffer location stores a sound segment indication that indicates one of the first number of sound segments stored in the memory and wherein the second number is less than the first number;

a visual indication associated with each of the buffer locations;

a keypad coupled to the buffer and adapted to change the sound segment indications stored in the buffer locations; and a processor including;

means for repetitively scrolling through the buffer locations to retrieve the sound segment indications store in the buffer locations, means for retrieving the sound segments associated with the retrieved sound segment indications, means for delivering the retrieved sound segments to the speaker to form a song or a tune; and means for operating the visual indication associated with each of the buffer locations when the delivering means delivers the retrieved sound segment indicated at each of the buffer locations to the speaker.

18. The sound making device of claim 17, wherein the keypad includes a multiplicity of keys, each of which is associated with a different one of the sound segments stored in the memory and each of which includes a pictorial representation of the sound segment associated therewith.

19. The sound making device of claim 17, wherein the visual indication comprises light emitting diodes.

20. The sound making device of claim 17, wherein the processor stores and implements a test routine for testing the operation of the keypad and the visual indications and includes means for initiating the test routine based on operation of the keypad.

21. The sound making device of claim 17, wherein the keypad includes a key that causes the processor to retrieve the sound segment indicated by one of the sound segment indications stored in one of the buffer locations in a consecutively repetitive manner.

22. The sound making device of claim 17, wherein the keypad includes a key that resets the sound segment indications stored in the buffer locations to default sound segment indications.

23. The sound making device of claim 17, wherein the second number equals four.

24. The sound making device of claim 17, further including a potentiometer coupled to the processor that controls the rate at which the retrieved sound segments are delivered to the speaker.

* * * * *